United States Patent
Yang

(10) Patent No.: US 8,737,461 B2
(45) Date of Patent: May 27, 2014

(54) RECEIVING EQUALIZATION DEVICE IN COMMUNICATION SYSTEM AND RECEIVING EQUALIZATION METHOD

(75) Inventor: Choong Reol Yang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 273 days.

(21) Appl. No.: 12/883,736

(22) Filed: Sep. 16, 2010

(65) Prior Publication Data

US 2011/0129010 A1    Jun. 2, 2011

(30) Foreign Application Priority Data

Nov. 27, 2009    (KR) .................... 10-2009-0115880

(51) Int. Cl.
*H03H 7/30*    (2006.01)
*H03H 7/40*    (2006.01)
*H03K 5/159*   (2006.01)

(52) U.S. Cl.
USPC ........... 375/233; 375/232; 375/234; 375/235; 375/230; 708/322; 708/323

(58) Field of Classification Search
USPC ........... 375/232–235, 230, 350; 708/322, 323
See application file for complete search history.

(56) References Cited

U.S. PATENT DOCUMENTS 7,242,712 B1     7/2007  Katic
2010/0080282 A1*  4/2010  Zhong et al. .................. 375/233

FOREIGN PATENT DOCUMENTS

KR    2006-0089429    8/2006

OTHER PUBLICATIONS

ISI Mitigation Using Bit-Edge Equalization in High-Speed Backplane Data Transmission [icccas2008, pp. 589-594, 2008].

* cited by examiner

*Primary Examiner* — Phuong Phu
(74) *Attorney, Agent, or Firm* — Staas & Halsey LLP

(57) ABSTRACT

Disclosed are a receiving equalization device and a method thereof, the receiving equalization device including a subtracter to output a first output signal, an eye monitor block to obtain a sampling timing by using the output first signal, and a slicer to generate a sampling signal by sampling the first output signal based on the sampling timing, and to return the generated sampling signal to the subtracter via a feedback filter or an algorithm determining block.

8 Claims, 5 Drawing Sheets

RECEIVING EQUALIZATION DEVICE IN COMMUNICATION SYSTEM AND RECEIVING EQUALIZATION METHOD

CROSS-REFERENCE TO RELATED APPLICATION

This application claims the benefit of Korean Patent Application No. 10-2009-0115880, filed on Nov. 27, 2009, in the Korean Intellectual Property Office, the disclosure of which is incorporated herein by reference.

BACKGROUND

1. Field

The present invention relates to a receiving equalization device and a receiving equalization method.

2. Description of Related Art

A 10 Gpbs-class high-speed communication system performs transmission and reception of data via a backplane. A backplane channel for a conventional 10 Gpbs transmission may be a maximum of 40 inches, and may include a 30 inch backplane, two 3 inch daughter cards, and two 2 inch connectors. These dimensions are defined in the IEEE STD 802.3ap 10 GBASE-KR standard. Here, in a case of a single differential lane, two lines constitute a single pair, and an impedance of an entire system may be 100 ohm. A differential pair is constituted by four differential lanes, and may provide 10 Gbps per lane.

A conventional high-speed receiving equalization device may be designed based on a backplane channel, a length of which is less than or equal to 34 inches. As a length of the channel becomes longer, an effect on a channel mismatch component or an inter-symbol interference (ISI) component, such as a return loss, an insertion loss, a crosstalk, and the like, increases, and thus, a performance of the communication system may be deteriorated.

An element that most affects the backplane channel may be a near-end crosstalk (NEXT) component and a far-end crosstalk (FEXT). The two crosstalk components may cause a jitter and may affect an eye-open between transmitter and a receiver.

In general, a bit-center equalization scheme may be a scheme of obtaining a sampling timing from a part where an eye is maximally opened in an eye monitor. Another equalization scheme in the high-speed communication system that passes through a backplane environment may be a bit-edge equalization scheme. The bit-edge equalization scheme may not discover a point of a maximum eye-opening in the eye monitor, but may obtain a sampling timing by discovering a zero-crossing point.

Recently, a standard for a 40 Gpbs-class Ethernet system defined in the IEEE STD 802.3ba standard adopts an Ethernet transmission scheme that is constituted by four 10 Gpbs channels, and thus, the communication system is designed to provide 40 Gbps via 4 lanes. This is defined in the IEEE STD 802.3ba 40 GBASE-4KR standard.

In a 40 Gpbs-class multi-channel environment, namely, a four 10 Gpbs-class lanes environment, a jitter due to a mismatch of components between the channels may cause a crosstalk in the channels, efficiency of the channels may be damped less than a conventional channel, and an ISI may be generated due to crosstalk components introduced from another lane, and thus, a video quality may be deteriorated. The 802.3ba standard may have a transmission pre-equalization device having 3 taps to reduce the crosstalk components, thereby reducing the mismatch components between the channels.

However, there may be a difficulty in correcting a channel in a real communication environment by using a fixed transmission pre-equalization device having three taps based on the IEEE 802.3ba standard. Accordingly, there is a desire for an adaptive equalization method that is capable of being adaptable to a channel of a receiving end of the communication system to provide a bit error rate (BER) of $10^{-12}$.

Most of the IEEE 802.3ba standard defines a transmission equalization device to check a transmission signal based on a standard and a medium parameter, such as a cable, a printed circuit board (PCB), a trace, and the like, and does not separately define the receiving equalization device.

Accordingly, a conventional art may provide a receiving equalization method through a standard-based high-speed multi-channel backplane to a receiving end of the communication system to satisfy an electrical 40 Gpbs-class backplane Ethernet standard defined in the IEEE STD 802.3ba standard.

FIG. 1 illustrates a receiving equalization device according to a conventional art.

A jitter generated in a communication channel may prevent the receiving equalization device from obtaining an accurate value when the receiving equalization device obtains a sampling timing, thereby deteriorating a performance of a system. The deterioration of the performance of system may indicate a decrease of a performance of a BER due to a mismatch of the sampling timing. To maximize the performance of the BER, obtaining of an optimal timing is important. Accordingly, the receiving equalization device 100 obtains the sampling timing by using an eye monitor block as illustrated in FIG. 1.

The eye monitor block may obtain the sampling timing by using a bit-center scheme or a bit-edge scheme. The eye monitor block may receive a signal by using an SW and a timer at an initial time, and may obtain the sampling timing by receiving a signal corrected by the receiving equalization device 100 when the communication system is stable.

As described above, when a signal is received before equalization is performed, it is not easy for the eye monitor block to obtain an initial sampling timing by using a signal having a jitter. Thus, there is a desire for a sampling timing obtaining algorithm that may quickly and accurately obtain the sampling timing at the initial time, and may not lose the sampling timing even when another jitter component is introduced from a channel.

SUMMARY

An aspect of the present invention provides a receiving equalization device and a receiving equalization method in a communication system that receives data transmitted in a class of dozens of Gbps via a transmission network, the receiving equalization device and the receiving equalization method eliminating a crosstalk and inter-channel interference from a receiving end of a backplane to satisfy a reception performance defined in the IEEE STD 802.3ba standard, thereby enabling the communication system to be suitable for receiving a high quality video image.

Another aspect of the present invention provides a receiving equalization device and a receiving equalization method in a communication system where the receiving equalization device and the receiving equalization method obtains an optimal sampling point by combining a bit-edge equalization scheme and a bit-center equalization scheme, thereby improving a reception performance of a digital communication system in a class of dozens of Gbps.

Another aspect of the present invention provides a receiving equalization device and a receiving equalization method in a communication system where the receiving equalization device and the receiving equalization method easily obtains an initial sampling timing from a channel having a jitter.

According to an aspect of the present invention, there is provided a receiving equalization device including a subtracter to output a first output signal, an eye monitor block to obtain a sampling timing by using the output first signal, and a slicer to generate a sampling signal by sampling the first output signal based on the sampling timing, and to return the generated sampling signal to the subtracter via a feedback filter or an algorithm determining block According to another aspect, there is provided a receiving equalization method including obtaining a sampling timing by using a first output signal outputted from a subtracter, sampling the first output signal based on the sampling timing, and returning the generated sampling signal to the subtracter via a feedback filter or an algorithm determining block.

Additional aspects, features, and/or advantages of embodiments will be set forth in part in the description which follows and, in part, will be apparent from the description, or may be learned by practice of the disclosure.

Effect

According to an embodiment of the present invention, a receiving equalization device and a receiving equalization method are additionally provided to a receiving side of a communication system, improving an inter-symbol interference (ISI) by eliminating a jitter and crosstalk from a channel, and preventing a deterioration of a bit error rate (BER) performance of a system, thereby improving a quality of received video.

According to an embodiment of the present invention, a sampling timing is promptly obtained at an initial time, and a loss of a sampling timing that occurs when a jitter component is introduced to a channel may be effectively prevented.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
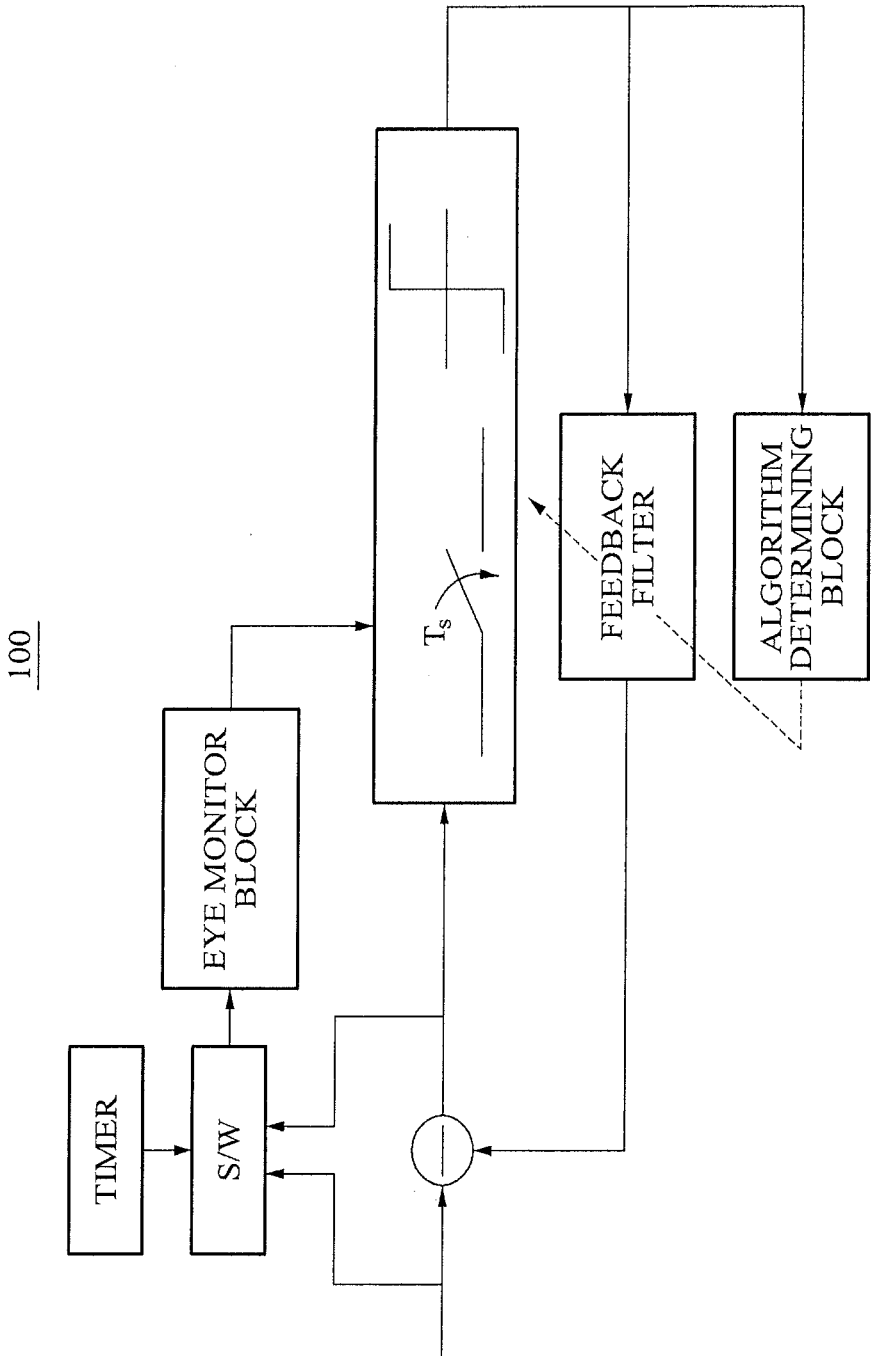
FIG. 1 is a diagram illustrating a receiving equalization device according to a conventional art.

Reference will now be made in detail to embodiments, examples of which are illustrated in the accompanying drawings, wherein like reference numerals refer to the like elements throughout. Embodiments are described below to explain the present disclosure by referring to the figures FIG. 2 illustrates a receiving equalization device 200 according to an embodiment of the present invention.

Figure 2:
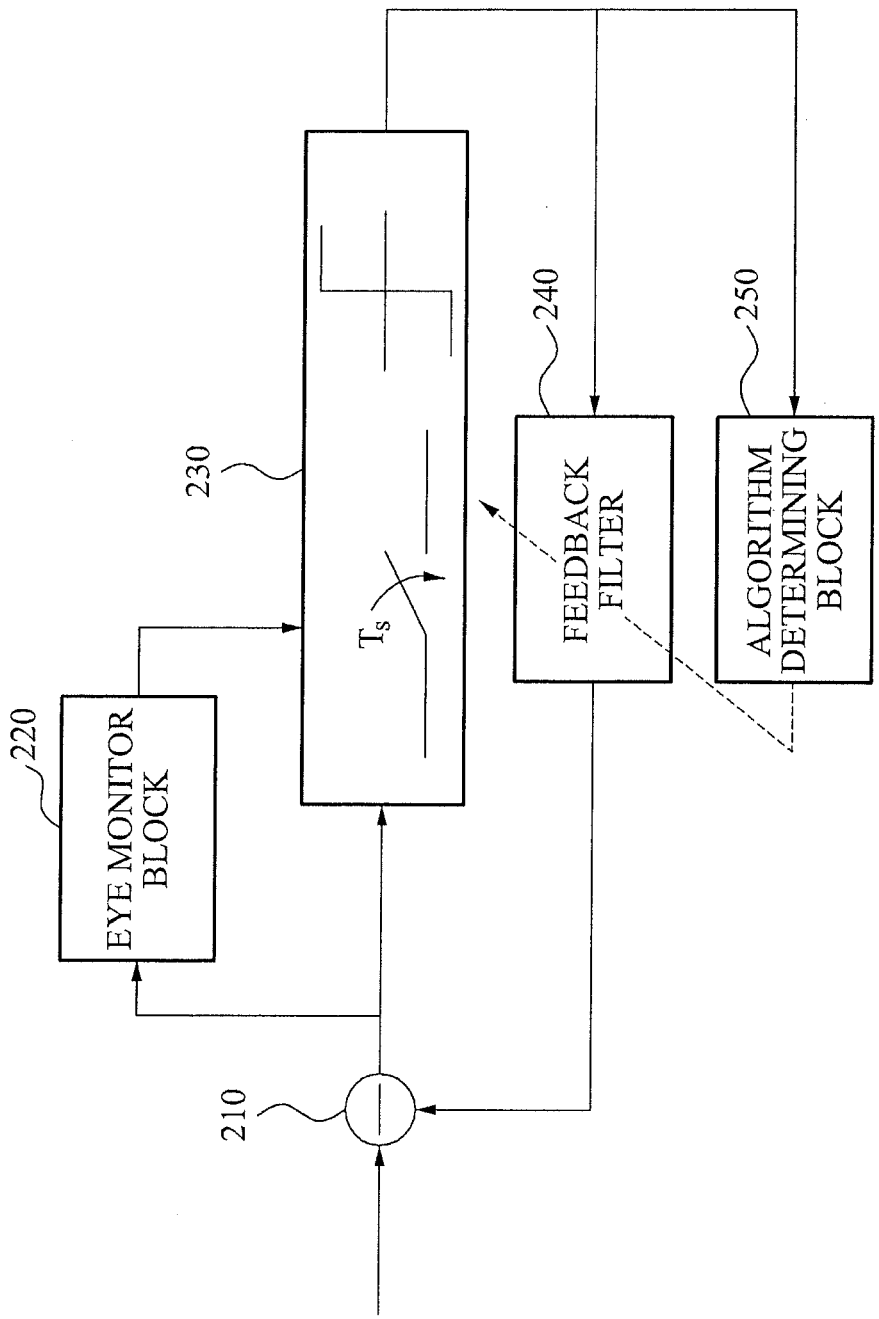
FIG. 2 is a diagram illustrating a receiving equalization device according to an embodiment of the present invention.

The receiving equalization device 200 of FIG. 2 has a format of a decision feedback equalizer (DFE), and may include an eye monitor block 220 for obtaining a sampling timing.

The receiving equalization device 200 may include a subtracter 210, the eye monitor block 220, a slicer 230, a feedback filter 240, and an algorithm determining block 250.

The eye monitor block 220 may obtain the sampling timing by using a first output signal outputted from the subtracter 210. In other words, the eye monitor block 220 may receive the first output signal of the subtracter 210 to obtain the sampling timing.

The eye monitor block 220 may obtain a first sampling timing based on a bit-edge (BE) equalization or may obtain a second sampling timing based on a bit-center (BC) equalization. In this instance, the eye monitor block 220 may include a BC/BE selector that determines one of the first sampling timing and the second sampling timing as the sampling timing, based on a predetermined condition. The predetermined condition may be a timing point in time or a channel environment, and the like.

As described above, to obtain an accurate sampling timing, the eye monitor block 220 may obtain both a bit-edge part and a bit-center part the first sampling timing based on the bit-edge equalization and the second sampling timing based on the bit-center equalization, thereby estimating the sampling timing by using the obtained value the first sampling timing and the second sampling timing.

Also, the eye monitor block 220 may include an amplitude level measurement block that identifies a point where a voltage value of the first output signal is maximum, and may obtain a first point where the voltage value is zero crossed based on the identified point. As an example, the vertical level measurement block may identify the point where the voltage value is maximum, may shift the identified point by 0.5 unit interval (UI), may measure the voltage value at the shifted point, and may estimate a point where the measured voltage value is zero crossed as the first point, thereby having an effect of enabling a quick initial sampling capture time. In this instance, a point estimated immediately prior to the estimation of the first point may be fed back to the vertical level measurement block, and may affect the estimation of the first point in the vertical level measurement block.

Also, the eye monitor block 220 may include a zero crossing point measurement block that identifies a point where the voltage value of the first output signal is zero crossed, and obtains a second point where the voltage value is maximum based on the identified point. As an example, the zero crossing point measurement block may identify the point where the voltage value is zero crossed, may shift the identified point by 0.5 UI, may measure the voltage value at the shifted point, and may estimate a point where the measured voltage value is maximum as the second point, thereby having an effect of enabling a quick initial sampling capture time. In this instance, a point measured immediately prior to the estimation of the second point may be fed back to the zero crossing point measurement block, and may affect the estimation of the second point in the zero crossing point measurement block.

Also, the eye monitor block 220 may include a jitter reduction block that obtains the sampling timing by using an average value of the first point obtained by the vertical level measurement block and the second point obtained by the zero crossing point measurement block.

The sampling timing obtained by the eye monitor block 220 may be inputted to the slicer 230. The output signal of the subtracter 210 is an analogue signal, and thus, a sampling of the output signal is used. A sampling signal may be determined as a bit in the slicer 230, and may be inputted as either an input of the feedback filter 240 and an input of the algorithm determining block 250.

The slicer 230 may generate the sampling signal by sampling the first output signal based on the sampling timing, and may return the generated sampling signal to the subtracter 210 via the feedback filter 240 or the algorithm determining block 250. In this instance, the slicer 230 may convert the sampling signal into a bit-format, and may return the converted sampling signal to the subtracter 210.

The subtracter 210 may output, to the eye monitor block or the slicer 230, a second output signal generated by using the sampling signal. That is, the subtracter 210 may identify a correction value from the sampling signal, and may correct an output signal outputted after the output of the first output signal, based on the identified correction value, thereby generating the second output signal. Also, although the subtracter 210 outputs the first output signal at an initial time, the subtracter 210 may correct the first output signal based on the predetermined correction value and may input the corrected first output signal to the eye monitor block 220.

The described receiving equalization device 200 may provide a receiving equalization method using a standard-based high-speed multi-channel backplane to a receiving end, thereby easily satisfying an electrical 40 Gpbs backplane Ethernet standard defined in the IEEE STD 802.3ba standard.

As an example, the receiving equalization device 200 may include a receiving circuit that receives a feedback signal and a reception signal. The reception signal may have a symbol of a symbol rate which has a symbol interval.

Also, the receiving equalization device 200 may include a subtracter circuit that generates an equalized signal from a next reception signal. The receiving equalization device 200 may easily reduce an inter-symbol interference (ISI) component by using the subtracter circuit.

The slicer 230 may receive the equalized signal by using the subtracter 210, may determine a logical status of the equalized signal, and may provide an output signal.

A feedback filter including the subtracter circuit and the slicer 230 may receive an output of the slicer as an input, and may provide a feedback signal to the subtracter circuit. The feedback signal may eliminate a single post-cursor ISI component or may eliminate multiple post-cursor ISI components. A feedback filter circuit may include a first delay tap with respect to the feedback filter. The delay tap may delay the feedback signal and thus, a change of the feedback signal may be sufficiently matched with a change of a symbol interval of the signal received from the subtracter circuit.

The feedback filter circuit may receive the sampling timing from the slicer 230, may perform sampling of the equalized signal, and may obtain a symbol again through the slicer 230.

The sampling timing determining circuit may include the eye monitor block 220 and a sampling timing generating circuit. A sampling timing restoring circuit may receive, as an input, an output of the subtracter 210 that subtracts the equalized signal from the reception signal.

A clock restoring circuit that provides a clock signal to a slicer 230 may generate the clock signal from the equalized signal. In the initial time, a value set in the tap system of the filter may be a value set in advance and may be a value to correct a channel. In this instance, remaining taps excluding a main-tap have a value of zero, and thus, the sampling timing generating circuit may obtain the sampling timing, even at the initial time, by using the equalized signal that is the output signal of the subtracter 210.

The first delay tap may determine a value based on a bit-center/bit-edge determination of the symbol interval. The symbol timing generating circuit may receive the output signal of the subtracter 210, and may generate a symbol timing based on a result that is outputted through the eye monitor block 210

The eye monitor block 210 may include an eye monitor and a BC/BE selector.

The eye monitor may include a vertical level measurement block, a zero crossing measurement block, and a jitter reduction block used for reducing a jitter.

The vertical level measurement block may measure a vertical voltage level of an input signal, and may store a point where the measurement is performed. Also, the zero crossing point measurement block may identify a zero-crossing point in a section where a bit is transited. Also, the jitter reduction block may discover an estimated zero crossing point and an estimated voltage at a point that is 0.5 UI away from an output of the vertical level measurement block and the zero crossing point measurement block, and may reduce an effect from the jitter by averaging the estimated zero crossing point and the estimated voltage with a zero crossing point and a magnitude of the voltage level that are found in advance.

Here, the jitter reduction block may be a device that calculates an average value of each point measured by the vertical level measurement block and the zero crossing point measurement block, by using a histogram diagram. The jitter reduction block may prevent a dramatic change in the sampling timing and may obtain the sampling timing as an original sampling timing, by calculating the average value.

In other words, the average value may prevent the sampling timing from being changed due to an outlier, also, when the sampling timing is not the original timing, since a value of a sample obtained by the eye monitor and the like is less than a value that the sample should have, discovery of an optimal value is important. The optimal value may be a maximum eye opening point in the eye monitor, and may be an optimal zero crossing point. Accordingly, the jitter reduction block may average the point measured by the vertical level measurement block and the point measured by the zero crossing point measurement block, to obtain the optimal value.

The BC/BE selector may select one of a bit-edge equalization scheme and a bit-center equalization scheme based on a channel condition.

Figure 3:
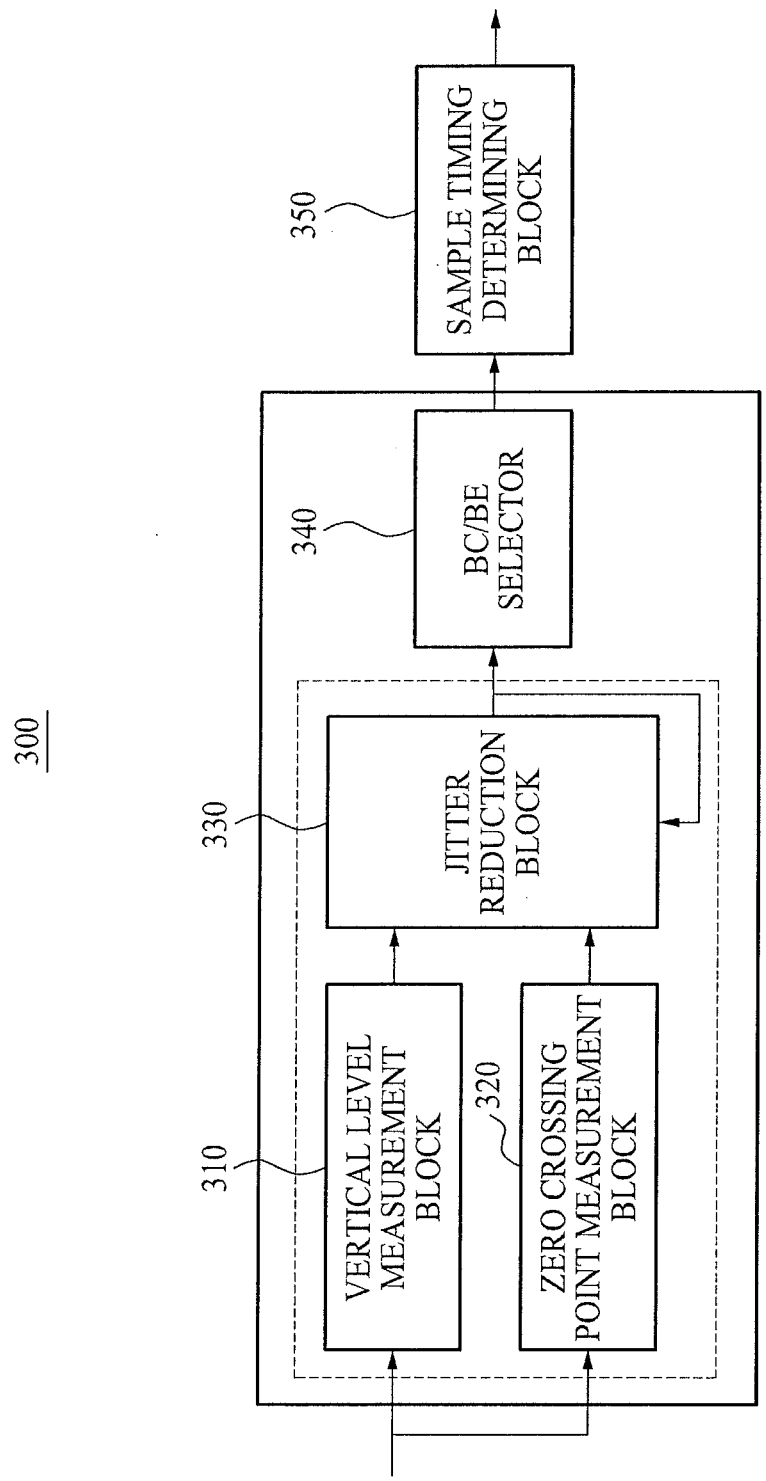
FIG. 3 is a diagram illustrating an internal format of an eye monitor block according to an embodiment of the present invention.

FIG. 3 illustrates an internal format of an eye monitor block 300 according to an embodiment of the present invention.

Referring to FIG. 3, the eye monitor block 300 may include a vertical level measurement block 310, a zero crossing point measurement block 320, a jitter reduction block 330, a BC/BE selector 340, and a sample timing determining block 350.

A signal inputted to the eye monitor block 300 may be transferred to the vertical level measurement block 310 and the zero crossing point measurement block 320.

The vertical level measurement block 310 may identify a point where a voltage value is maximum, may shift the identified point by 0.5 UI, may measure the voltage value at the shifted point, and may obtain a first point where the measured voltage value is zero crossed. That is, the vertical level measurement block 310 may be a section where the vertical level, namely, the voltage value, is measured, and also may be a block that obtains a point where the voltage is maximum.

First, the vertical level measurement block 310 may discover a maximum voltage value $V_1$ and a point $P_{V1}$ of the maximum voltage value from a signal that is received by the eye monitor block 300, and at the same time, the zero crossing point measurement block 320 may discover a zero crossing point $P_{ZC1}$.

Also, the zero crossing point measurement block 320 may identify a point where the voltage value is zero crossed, may shift the identified point by 0.5 UI, may measure the voltage value at the shifted point, and may obtain a second point where the measured voltage value is maximum. In other words, the zero crossing point measurement block 320 may be a block to obtain point of the zero crossing, and may obtain a value that is zero crossed.

The zero crossing point measurement block 320 may discover a point that is 0.5 UI away from each point based on a value measured by the vertical level measurement block 310, and may discover a point $P_{ZC2}$ that is shifted by 0.5 UI from a point having the maximum voltage value $P_{V1}$ based on a value measured by the vertical level measurement block 310. Here, $P_{ZC2}$ may be express by $$P_{ZC2} = P_{V1} - 0.5 \text{ UI}$$

Also, the zero crossing point measurement block 320 may discover a value $P_{V2}$ that is shifted by 0.5 UI from the zero crossing point $P_{ZC1}$. Here, $P_{V2}$ may be express by $$P_{V2} = P_{ZC1} + 0.5 \text{ UI}$$

The jitter reduction block 330 may obtain the sampling timing by using the first point obtained by the vertical level measurement block 310 and the second point that is obtained by the zero crossing point measurement block 320.

Here, the jitter reduction block 330 may obtain a zero crossing point $P_{e1}$ by using Equation 1 as given below.

$$P_{e1} = \frac{(P_{ZC1} + P_{ZC2})}{2} \qquad \text{[Equation 1]}$$

Also, the jitter reduction block 330 may obtain a maximum voltage point by using Equation 2 as given below.

$$V_{e1} = \frac{(V_1 + V_2)}{2} \qquad \text{[Equation 2]}$$

The jitter reduction block 330 may obtain a final estimated value by using an existing reference value or a fed back value based on the maximum voltage point $P_{e1}$ and $V_{e1}$.

That is, when a voltage at a first shifted zero crossing (ZC) point ($P'_{ZC}$) is assumed to be a first shifted ZC to obtain $P_{ZC}$ that is 0.5 UI away from a first VLM point (V1), a ZC point may be evaluated based on Equation 3 as given below.

$$\hat{P}_e = (P_{ZC} + \hat{P}_{ZC})/2 \qquad \text{[Equation 3]}$$

Also, a voltage at the 1st ZC point that is 0.5 UI shifted from the 1st VLM point may be evaluated based on Equation 4 as given below.

$$\hat{V}_e = (V_1 + \hat{V}_1)/2 \qquad \text{[Equation 4]}$$

Figure 4:
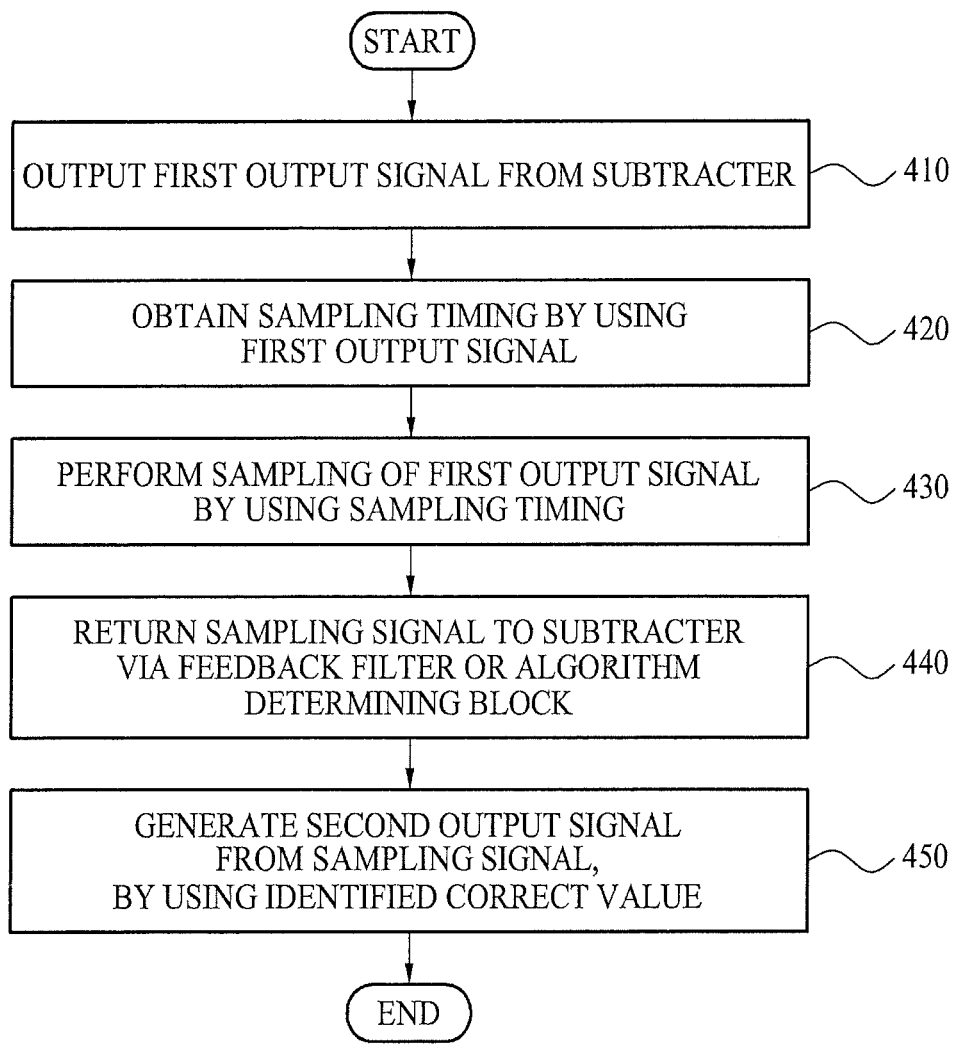
FIG. 4 is a flowchart illustrating a receiving equalization method according to an embodiment of the present invention.

FIG. 4 is a flowchart illustrating a receiving equalization method according to an embodiment of the present invention.

The receiving equalization method may be embodied by the receiving equalization device 200 of FIG. 2. Hereinafter, FIG. 4 will be described with reference to the descriptions of FIG. 2.

In operation 410, the receiving equalization device 200 may input, to the eye monitor block 220, a first output signal outputted from the subtracter 210.

In this instance, when the subtracter 210 initially outputs a signal, the subtracter may correct the outputted signal based on a predetermined value and may input the corrected signal to the eye monitor block 220.

In operation 420, the eye monitor block 220 in the receiving equalization device 200 may obtain a sampling timing by using the inputted first output signal.

A vertical level measurement block in the eye monitor block 220 may identify a point where a voltage value is maximum, may shift the identified point by 0.5 UI, and may obtain a first point where the voltage value of the shifted point is zero crossed. In this instance, the vertical level measurement block may obtain the first point by using a previously obtained first point.

Also, a zero crossing point measurement block in the eye monitor block 220 may identify a point where the voltage value is zero crossed, may shift the identified point by 0.5 UI, and may obtain a second point where the voltage value of the shifted point is maximum. In this instance, the zero crossing point measurement block may obtain the second point by using a previously obtained second point.

Also, a jitter reduction block in the eye monitor block 220 may obtain the sampling timing by using an average point of the first point and the second point.

In operation 430, the slicer 230 in the receiving equalization device 200 may perform sampling of the first output signal by using the sampling timing.

In operation 440, the slicer 230 in the receiving equalization device 200 may return the sampling signal, generated by the sampling, to the subtracter 210 via the feedback filter 230 or the algorithm determining block 250.

In this instance, the slicer 230 may convert the sampling signal into a bit-format, and may input the converted sampling signal into the feedback filter 240 or the algorithm determining block 250.

In operation 450, the subtracter 210 in the receiving equalization device 200 may output the second output signal generated by the sampling, to the eye monitor block 220 or the slicer 230.

In this instance, the subtracter 210 may identify a correction value from the sampling signal, may correct an output signal outputted after the output of the first output signal based on the identified correction value, and may generate the second output signal.

As described above, the receiving equalization device 200 may provide a receiving equalization method through a standard-based high-speed multi-channel backplane to a receiving end of the communication system, thereby easily satisfying an electrical 40 Gpbs backplane Ethernet system defined in the IEEE STD 802.3ba standard.

Figure 5:
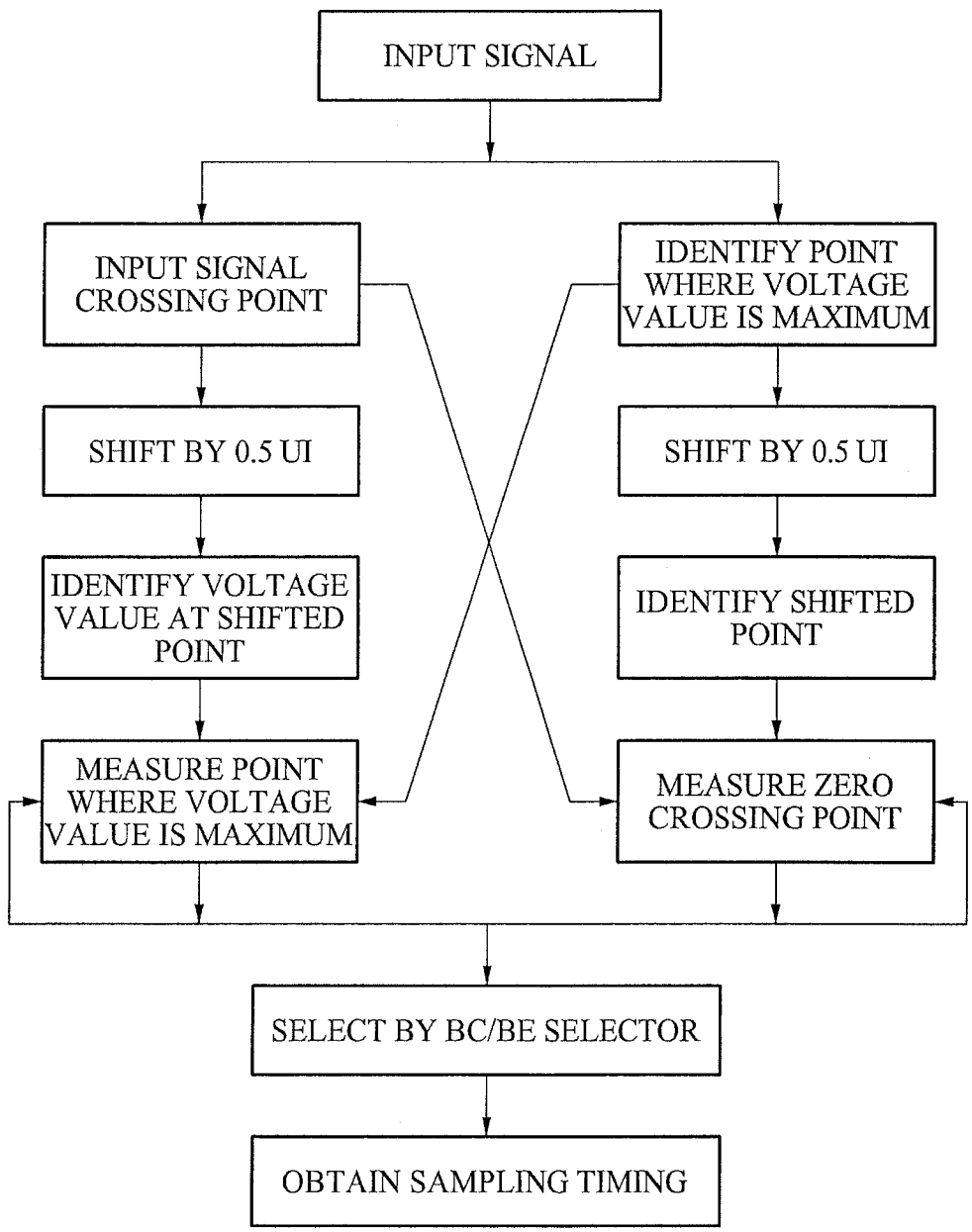
FIG. 5 is a flowchart illustrating a process of obtaining a sampling timing according to an embodiment of the present invention.

FIG. 5 is a flowchart illustrating a process of obtaining a sampling timing according to an embodiment of the present invention.

When a signal is received, the eye monitor block 220 of FIG. 2 may perform each role in the zero crossing point measurement block and the vertical level measurement block, and may obtain an average value. In this instance, the eye monitor block 220 may input a previously estimated value to each block to prevent the sampling timing from being lost. The BC/BE selector in the eye monitor block 220 may determine one of the bit-center equalization scheme and the bit-edge equalization scheme to obtain a value, and may determine the sampling timing based on the selected equalization scheme.

The method according to the above-described an embodiment of the present invention may also be implemented through computer readable code/instructions in/on a medium, e.g., a computer readable medium, to control at least one processing element to implement any above described embodiment. The medium can correspond to medium/media permitting the storing or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, an embodiment of the present invention can also be implemented as hardware, e.g., at least one hardware based processing unit including at least one processor capable of implementing any above described embodiment.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A receiving equalization device comprising:
a subtracter to output a first output signal;
an eye monitor block to obtain a sampling timing by using the output first signal; and
a slicer to generate a sampling signal by sampling the first output signal based on the sampling timing, and to return the generated sampling signal to the subtracter via a feedback filter or an algorithm determining block,
wherein the subtracter performs:
identifying a correction value from the sampling signal; and
generating a second output signal by correcting an output signal outputted after the first output signal based on the identified correction value, and outputting the generated second output signal to the eye monitor block or the slicer.

2. The receiving equalization device of claim 1, wherein the slicer converts the sampling signal into a bit-format and returns the converted sampling signal to the subtracter.

3. The receiving equalization device of claim 1, wherein the eye monitor block either obtains a first sampling timing based on a bit-edge (BE) equalization or obtains a second sampling timing based on a bit-center (BC) equalization.

4. The receiving equalization device of claim 3, wherein the eye monitor block comprises a BC/BE selector to select one of the first sampling timing and the second sampling timing based on a predetermined condition, when both the first sampling timing and the second sampling timing are obtained.

5. The receiving equalization device of claim 1, wherein the eye monitor block comprises:

a vertical level measurement block to identify a point where a voltage value of the first output signal is maximum, and to obtain a first point where the voltage value is zero crossed based on the identified point;
a zero crossing point measurement block to identify a point where the voltage value of the first output signal is zero crossed, and to obtain a second point where the voltage value is maximum based on the identified point; and
a jitter reduction block to obtain the sampling timing by using the first point obtained by the vertical level measurement block and the second point obtained by the zero crossing point measurement block.

6. The receiving equalization device of claim 5, wherein:
the vertical level measurement block shifts the identified point by 0.5 UI, measures the voltage value at the shifted point, and obtains a point where the measured voltage value is zero crossed as the first point; and
the zero crossing point measurement block shifts the identified point by 0.5 UI, measures the voltage value at the shifted point, and obtains a point where the measured voltage value is maximum as the second point.

7. A receiving equalization method comprising;
obtaining a sampling timing by using a first output signal outputted from a subtracter;
sampling the first output signal based on the sampling timing to generate a sampling signal;
returning the generated sampling signal to the subtracter via a feedback filter or an algorithm determining block;
identifying a correction value from the sampling signal;
generating a second output signal by correcting an output signal outputted from the subtracter after the output of the first output signal, based on the identified correction value; and
outputting the generated second output signal to an eye monitor block or a slicer.

8. A receiving equalization method comprising:
obtaining a sampling timing by using a first output signal outputted from a subtracter;
sampling the first output signal based on the sampling timing to generate a sampling signal; and
returning the generated sampling signal to the subtracter via a feedback filter or an algorithm determining block,
wherein the obtaining comprises:
identifying a point where a voltage value of the first output signal is maximum, and obtaining a first point where the voltage value is zero crossed based on the identified point;
identifying a point where the voltage value of the first output signal is zero crossed, and obtaining a second point where the voltage value is maximum based on the identified point; and
obtaining the sampling timing by using the first point obtained by the vertical level measurement block and the second point obtained by the zero crossing point measurement block.

* * * * *